United States Patent
Blaschke et al.

[11] Patent Number: 6,024,997
[45] Date of Patent: Feb. 15, 2000

[54] COOKIE DOUGH

[75] Inventors: Dieter Blaschke, La Tour-De-Peilz; Peter Nairn, St-Legier, both of Switzerland

[73] Assignee: Nestec S.A., Vevey, Switzerland

[21] Appl. No.: 09/130,117

[22] Filed: Aug. 6, 1998

Related U.S. Application Data

[63] Continuation of application No. PCT/EP97/07190, Dec. 17, 1997.

[51] Int. Cl.$^7$ .................................................. A21D 10/02
[52] U.S. Cl. .............................. 426/144; 426/76; 426/94; 426/128; 426/549
[58] Field of Search .............................. 426/128, 76, 94, 426/549, 144

[56] References Cited

U.S. PATENT DOCUMENTS

| | | | |
|---|---|---|---|
| 1,319,899 | 10/1919 | Rafert | 426/76 |
| 1,929,358 | 10/1933 | Keefer | 426/76 |
| 1,952,698 | 3/1934 | Willem | 31/5 |
| 3,397,064 | 8/1968 | Matz | 99/90 |
| 3,765,909 | 10/1973 | Moline | 99/192 R |
| 4,215,104 | 7/1980 | Ullman et al. | 424/15 |
| 4,517,209 | 5/1985 | Thornton et al. | 426/383 |
| 4,777,057 | 10/1988 | Sugisawa et al. | 426/412 |
| 4,859,473 | 8/1989 | Arciszewski et al. | 426/19 |
| 4,900,577 | 2/1990 | Arciszewski et al. | 426/563 |
| 5,049,399 | 9/1991 | Huang et al. | 426/87 |
| 5,171,599 | 12/1992 | Weber | 426/549 |
| 5,349,759 | 9/1994 | Anton et al. | 33/524 |
| 5,523,107 | 6/1996 | Wallin | 426/549 |

FOREIGN PATENT DOCUMENTS

| | | |
|---|---|---|
| 1338372 | 6/1996 | Canada . |
| 0 084 210 | 7/1983 | European Pat. Off. . |
| 0 145 550 | 6/1985 | European Pat. Off. . |
| 0 214 707 | 3/1987 | European Pat. Off. . |
| 94 17 488 | 1/1995 | Germany . |
| 90 01877 | 3/1990 | WIPO . |

OTHER PUBLICATIONS

Brochure from Readi–Bake International titled "Gourmet Cookies." No date.
Supermarket News, p. 40, Jun. 1990.

*Primary Examiner*—Lien Tran
*Attorney, Agent, or Firm*—Pennie & Edmonds LLP

[57] ABSTRACT

A ready-for-use cookie dough which can be preserved in the refrigerator and which is prepared from flour, sugar, baking powder and fat, containing between 0.3 and 1.5% baking powder and provided in a precut form or in a form with grooves.

15 Claims, 1 Drawing Sheet

COOKIE DOUGH

CROSS REFERENCE TO RELATED APPLICATION

This application is a continuation of PCT/EP97/07190 filed Dec. 17, 1997.

BACKGROUND ART

The invention relates to a ready-for-use cookie dough which can be preserved in the refrigerator and which is prepared from flour, sugar, baking powder and fat.

Cookie doughs already exist on the market. This dough exists in tubular form or it is packaged in a cup. During use, the consumer should use a spoon or a knife and form the cookie in circular form before baking it, which requires manipulation of the dough. If the packaging of this cookie dough is made in the form of a block, a forming device is needed in order to give the cookie the desired circular form. In this case, the forming leaves pieces which must then be reworked.

SUMMARY OF THE INVENTION

The aim of the present invention is to provide the consumer with a ready-for-baking cookie dough which does not require any manipulation during use and which does not leave any dough pieces to be recycled or worked.

The invention relates to a ready-for-use cookie dough which can be preserved in the refrigerator and which is prepared from flour, sugar, baking powder and fat, in which the content of baking powder is between about 0.3 and 1.5% and which is provided in a precut form ready for baking or in a form having grooves or score lines which define the pieces of the dough that are to be broken off and baked into cookies.

DETAILED DESCRIPTION OF THE INVENTION

The cookie dough according to the invention is provided in the form of a block. This block may be either of parallelepidpedal form, or of cylindrical form, or of prismatic form.

It has been observed that if a dough is used which has a baking powder content as mentioned above, it can be cut in the form of parallelepipedal, circular or prismatic blocks and that these forms deposited on a baking tray and placed in the oven for baking flow during the baking step to provide cookies having a circular form.

To do this, it is necessary to have a block of dough in which either an imprint or a precut has been made so as to facilitate breaking in order to make small blocks which are placed directly for oven baking. It is therefore sufficient to have a knife with which cuts are made fully in the grooves, or the rectangular blocks, the circular pieces or the triangular pieces are even simply pulled out if they are already precut. There is thus no waste due to forming and no manipulation, other than cutting, on the part of the consumer.

In the present description, the contents are given by weight. Baking powder is understood to mean a mixture of at least one bicarbonate or carbonate salt, at least one acidifying agent and at least one separating agent. None of the constituents of this mixture is critical. Sodium bicarbonate is preferably used with sodium diphosphate or disodium dihydrogen pyrophosphate with a starch as separating agent. These mixtures are directly available commercially with a fixed composition. For example, the bicarbonate is present in an amount of 30%, the acid in an amount of 40% and the separating agent in an amount of 30%. In a specific embodiment, it is also possible to use only sodium bicarbonate, in an amount of about 0.2 to 0.7%, preferably 0.5%.

The flour used is a cereal flour with a high content or with a lower content of proteins. Any type of flour can be taken into consideration. The flour content is normally between about 10 and 40%, preferably between 27 and 34%.

The sugar used is not critical. Its content is between about 10 and 40%. The sugars which can be used are fructose, sucrose, dextrose and maize syrup. Sucrose is preferred, for example, in the form of granulated sugar. The dough should have a good resistance during preservation in the refrigerator, that is to say that it should be quite hard, but should nevertheless spread well during baking so as to develop in a circular form. It is with sucrose that this result is best achieved. It is also necessary to have a dough having a water content of the order of about 6 to 9%. In order to increase the sugar content, it is also possible to add a sugar substitute such as sorbitol or any other known sugar substitute.

The fat used in the dough composition according to the invention is a solid or liquid fat at room temperature. It can be of animal or plant origin, for example lard, tallow, margarine, maize oil, copra oil, palm oil, sunflower oil, soya bean oil. It is also possible to use fat mixtures. These fats are emulsified or stabilized with mono- or diglycerides or other emulsifiers known in the art. For example, according to the invention, margarine which already contains the emulsifier is used. The fat content is between 10 and 25%. The type of fat used also has an influence on the flow capacity of the dough during baking.

As texturing agent, whole egg or egg white at a content of between about 0 and 10% is used, preferably at a content of about 2 to 5%.

The dough according to the invention may also contain flavoring agents, such as vanilla flavor and cocoa powder.

This dough may also contain chocolate in the form of pieces, pieces of oat flakes or groundnut pieces. It is also possible to have pieces or whole hazel nuts. The size of these pieces is not critical and may vary between about 1 and 10 mm. Dark, milk or white chocolate may be used. The content of chocolate is between about 10 and 30%. The chocolate used is a commercial chocolate or a chocolate which can be used in pastry making or in catering.

It is very convenient according to the invention to have a block of dough already having the correct thickness in order to avoid having to further roll out the dough. To this effect, a block is obtained which has a thickness of between about 1 and 3 cm.

As regards the precut dough block, it is envisaged so as to make it into parallelepipedal blocks of between about 3 and 4 cm in size and about 1 to 3 cm thick. If a cylindrical block is available, circles having a diameter of between about 3 and 6 cm and a thickness of between about 1 and 3 cm are made. In the case of a prismatic block, a thickness of between about 1 and 3 cm and an equilateral triangle with 3 to 6 cm sides are envisaged.

For the block having grooves, these are not critical as regards their sizes. Grooves are normally provided which have a width of the order of about 1 to 5 mm and an identical depth In this case, the consumer should either break the blocks like for a chocolate bar, or use a knife to finish the cutting along the grooves.

As a practical embodiment, the dough thickness may be 2 cm in order to make 3.5×3.5 cm blocks. For a block of 300 g, there would be 3×3 blocks, for a block of 400 g, 3×4 blocks and for a block of 500 g, 3×5 blocks.

When the blocks are ready, they are arranged on an oven tray and the baking is carried out conventionally, that is to say, at a temperature of 180° C. for 12 to 18 minutes. After baking, a cookie having a diameter of 7 cm is obtained for blocks of 3.3×3.5 cm.

Cookies which are quite round are obtained by virtue of the dough according to the invention using blocks whose form is substantially square.

The block of dough is wrapped conventionally, for example in a wrapping based on synthetic material or based on covered carton, so as to be protected from air and moisture. The shelf life of the dough according to the invention in a refrigerator is normally of the order of several months.

BRIEF DESCRIPTION OF THE DRAWING

The remainder of the description is made with reference to the single figure representing a parallelepipedal block of cookie dough.

The block (1) of cookie dough is prepared with the composition as stated in the following examples. The preparation is made conventionally and when the block is formed, marker rolls which make it possible to form the grooves (2) are made to pass over it. The choice therefore exists either to make only the imprints, or to make a complete cut. As the time of use, it is sufficient to break off one by one, the various blocks formed and to place them on a tray to put in the oven.

EXAMPLES

Figure 1:
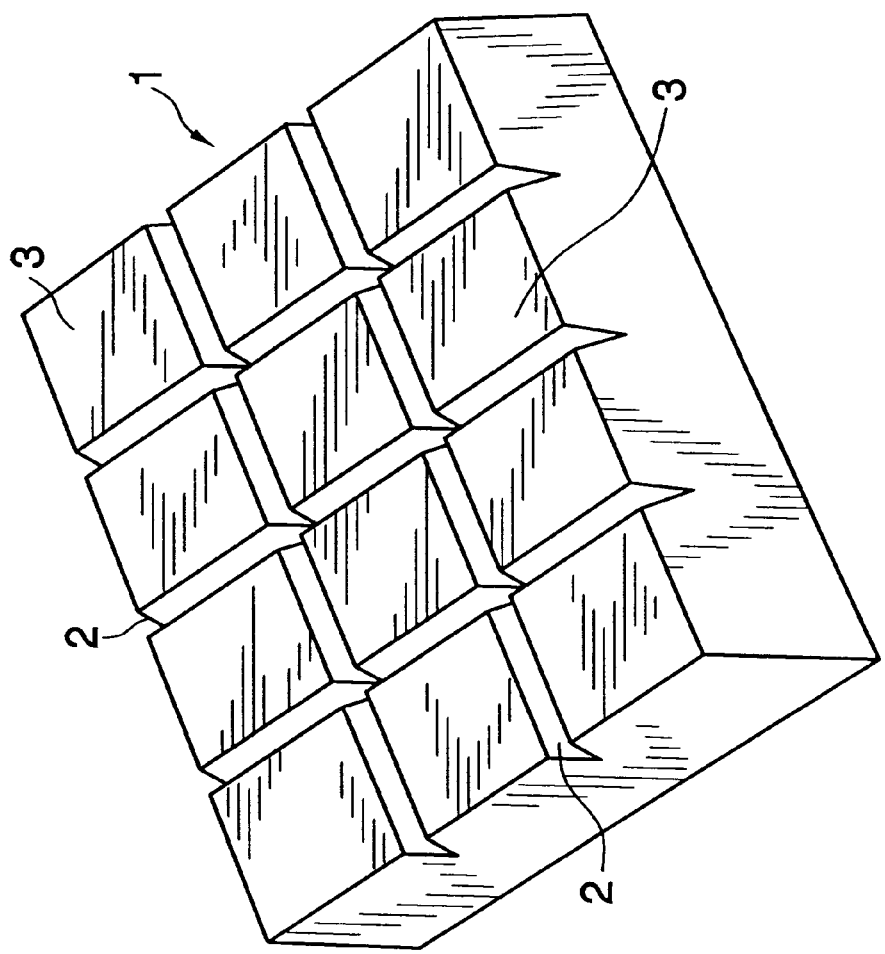

The remainder of the description is made with reference to the examples.

Examples 1 to 4

The various ingredients stated in the table below are mixed: the proportions are in % by weight.

| EXAMPLES | 1 | 2 | 3 | 4 |
| --- | --- | --- | --- | --- |
| Sugar | 33.5 | 34 | 33.8 | 34.1 |
| Whole Egg | 3.5 | 3.5 | 3.5 | 3.5 |
| Baking Powder | 0.7 | 1.00 | 1.5 | 1.5 |
| Salt | 0.3 | 0.3 | 0.3 | 0.3 |
| Fat | 12.8 | 12.9 | 12.8 | 13 |
| Water | 4.4 | 3.2 | 3.2 | 2.1 |
| Flavorings | 0.6 | 0.5 | 0.6 | 0.7 |
| Flour | 28 | 28.3 | 28.1 | 28.4 |
| Chocolate pieces | 16.2 | 16.3 | 16.2 | 16.4 |

The dough thus prepared is stored for 3 weeks in the refrigerator and 3.5×3.5 cm cookies are then made. After baking for 16 minutes at 180° C., cookies 7 cm in diameter are obtained.

For Example 1, the dough is considered too soft, for Examples 2 and 3, it is a little soft and for the last example, the consistency is judged to be good, in the light of the possibility of manufacturing the dough on an exiting production line. In the 4 cases, the dough blocks flows in a manner which is quite circular.

What is claimed is:

1. A ready-for-use refrigerated cookie dough which is prepared from flour, sugar, baking powder and fat, wherein the baking powder is present in an amount of between 0.3 and 1.5% and the dough is provided in a form of a block having a thickness of between about 1 and 3 cm and a surface which includes grooves or score lines thereon which intersect to define pieces of the dough to be broken off and baked into cookies, wherein the grooves or score lines have a width of between about 1 and 5 mm and a depth of between about 1 and 5 mm.

2. The cookie dough of claim 1, in the form of a parallelepipedal, cylindrical or prismatic block.

3. The cookie dough of claim 2, wherein the block is a parallelepipedal block of between about 3 and 4 cm in size.

4. The cookie dough of claim 1 having a flat circular shape with a diameter of between about 3 and 6 cm.

5. The cookie dough of claim 1, which contains between about 6 and 9% water.

6. The cookie dough of claim 5 in the form of a sheet.

7. The cookie dough of claim 1, further including pieces of chocolate, oat flakes, or groundnuts in an amount of between about 10 and 30% by weight of the dough.

8. The cookie dough of claim 7, wherein the chocolate, oat flakes, or groundnut pieces are between 1 and 10 mm in size.

9. The cookie dough of claim 1, wherein the flour is present in an amount of between about 10 and 40% by weight, the sugar is present in an amount of about 10 and 40% by weight, and the fat is present in an amount of between about 10 and 25% by weight, and further including a texturizing agent in an amount of up to 10%.

10. The cookie dough of claim 9, wherein the texturizing agent is whole egg or egg white and is present in an amount of between about 2 and 5% by weight.

11. The cookie dough of claim 1, wherein the fat is a solid or liquid fat at room temperature and animal or plant origin.

12. The cookie dough of claim 11, wherein the fat is lard, tallow, margarine, maize oil, copra oil, palm oil, sunflower oil, soya bean oil, or a mixture thereof.

13. The cookie dough of claim 2, wherein the block is in the form of a prismatic block or an equilateral triangle.

14. The cookie dough of claim 1, wherein the baking powder is a mixture of at least one bicarbonate or carbonate salt, at least one acidifying agent, and at least one separating agent.

15. The cookie dough of claim 1, wherein the baking powder is bicarbonate, in an amount of at least 0.5%.

* * * * *